United States Patent
Chizawa

(10) Patent No.: US 7,292,377 B2
(45) Date of Patent: Nov. 6, 2007

(54) IMAGE PROCESSING APPARATUS CAPABLE OF REDUCING POWER CONSUMPTION WHILE CONNECTED TO AN EXTERNAL DEVICE

(75) Inventor: Noriyoshi Chizawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 857 days.

(21) Appl. No.: 09/881,341

(22) Filed: Jun. 14, 2001

(65) Prior Publication Data
US 2003/0095298 A1 May 22, 2003

(30) Foreign Application Priority Data
Jun. 16, 2000 (JP) ............... 2000-182080

(51) Int. Cl.
H04N 1/36 (2006.01)
H04N 1/32 (2006.01)

(52) U.S. Cl. ..................... 358/421; 358/468

(58) Field of Classification Search .......... 358/1.15, 358/421, 1.13, 505, 1.5, 539, 474, 1.14, 1.8, 358/1.16, 443; 713/320, 323; 363/67
See application file for complete search history.

(56) References Cited

U.S. PATENT DOCUMENTS

| | | | | |
|---|---|---|---|---|
| 5,812,386 A | * | 9/1998 | Youn | ............ 363/86 |
| 5,897,252 A | | 4/1999 | Kanakubo | ............ 400/74 |
| 6,091,515 A | | 7/2000 | Kimura | ............ 358/434 |
| 6,334,719 B1 | * | 1/2002 | Kimura | ............ 400/54 |
| 6,526,516 B1 | * | 2/2003 | Ishikawa et al. | ............ 713/340 |
| 6,538,758 B1 | | 3/2003 | Ikegawa | ............ 358/1.13 |
| 2002/0126516 A1 | * | 9/2002 | Jeon | ............ 363/67 |

FOREIGN PATENT DOCUMENTS

| | | |
|---|---|---|
| JP | 61-258628 | 11/1986 |
| JP | 4-068862 | 3/1992 |
| JP | 6-332581 | 12/1994 |
| JP | 7-281852 | 10/1995 |
| JP | 9-034318 | 2/1997 |
| JP | 9-251228 | 9/1997 |
| JP | 10-56526 | 2/1998 |
| JP | 11-327814 | 11/1999 |
| JP | 11-341174 | 12/1999 |

OTHER PUBLICATIONS

Japanese Patent Office; Office Action of corresponding Japanese Patent Application No. 2000-182080, filed on Jun. 16, 2000; (Dated Aug. 9, 2004); 2 pages.
Japanese Patent Office; Office Action; of corresponding Japanese Patent Application No. 2000-182080 filed on Jun. 16, 2000; (dated Mar. 26, 2004); 2 pages.

(Continued)

*Primary Examiner*—Jerome Grant, II
(74) *Attorney, Agent, or Firm*—Morgan & Finnegan LLP

(57) ABSTRACT

A power control circuit (120) is driven by electric power supplied from a controller (200) as an external device via a cable (150), and controls opening/closure of a switch (104) in accordance with instructions from the controller (200). A DC power supply (105) converts an AC voltage supplied via the switch 104 into a DC voltage and provides it to individual units such as a reader (140).

26 Claims, 11 Drawing Sheets

OTHER PUBLICATIONS

English Abstract for Japanese Laid Open Patent Application No. 9-251228.

English Abstract for Japanese Laid Open Patent Application No. 9-034318.

English Abstract for Japanese Laid Open Patent Application No. 7-281852.

English Abstract for Japanese Laid Open Patent Application No. 4-068862.

English translation (partial) for Japanese Laid Open Patent Application No. 61-258628.

* cited by examiner

IMAGE PROCESSING APPARATUS CAPABLE OF REDUCING POWER CONSUMPTION WHILE CONNECTED TO AN EXTERNAL DEVICE

FIELD OF THE INVENTION

The present invention relates to an image processing apparatus and, more particularly, to an image processing apparatus having a function of connecting to another apparatus via a cable.

BACKGROUND OF THE INVENTION

FIG. 11 is a view showing the configuration of a general digital copying system. Reference numeral 4001 denotes an image scanner as an original reader; and 4002, a printer which includes a controller circuit for outputting an original image read by the image scanner 4001 and outputting an image on the basis of print data (e.g., PDL data) supplied from a computer device. This controller circuit provides a function of transferring an original image read by the image scanner 4001 to a computer device, i.e., provides a network scanner function. Note that images processed by a network scanner are often compressed by a compression scheme such as JPEG.

Reference numeral 4003 denotes a scanner connecting cable for connecting the image scanner 4001 and the printer 4002. The specifications of this scanner connecting cable 4003 differ from one manufacturer to another. An operation panel 4004 is controlled by the controller circuit of the printer 4002 to designate a copying operation and a network scan operation. This operation panel 4004 also displays a read image, designates trimming and color conversion, and displays information concerning the status of a part to be replaced. A user can perform various settings by operating the operation panel 4004 on an interactive basis. Reference numeral 4005 denotes an operation panel connecting cable for connecting the operation panel 4004 to the controller circuit of the printer 4002.

Reference numerals 4006a, 4006b, and 4006c denote computer terminals; 4007, a printer server; and 4008, a network line.

Output print data from each of the computer terminals 4006a, 4006b, and 4006c is transmitted to the printer server 4007 via the network line 4008, transmitted from the printer server 4007 to the printer 4006 via the network line 4008, and printed.

The digital copying system having the separate configuration as described above has the following characteristic features.

(1) System Extensibility

Since the image scanner 4001 and the printer 4002 are separated, the system can be extended from a printer system to a digital copying system by add-on of the image scanner 4001 after the printer 4002 is purchased.

(2) Connection Between Different Types of Apparatuses

Different types of apparatuses can be connected by standardizing the interface between the image scanner 4001 and the printer 4002. For example, a full-color image scanner A and a black-and-white image scanner B can be selectively connected to the printer 4002. Also, the full-color image scanner A can be readily exchanged with its another version, e.g., a full-color image scanner A+ of high image quality type or a full-color image scanner AA as a low-end version. This allows easy upgrading or replacement of the system.

(3) Ease of Development

Since the image scanner 4001 and the printer 4002 can be independently developed, it is readily possible to shorten the development time and add new functions.

The digital copying system as described above is being demanded to reduce the power consumption of the whole system.

For example, if the power supply of the image scanner 4001 is kept on to rapidly meet a demand for copying, electric power consumed by the image scanner 4001 in a period during which processing other than copying is executed is entirely wasted. On the other hand, if the power supply of the image scanner 4001 is turned on only during copying, a time required to activate the power supply lowers the productivity.

SUMMARY OF THE INVENTION

The present invention has been made in consideration of the above situation, and has as its object to reduce the power consumption of an image processing apparatus.

It is an additional object of the present invention to achieve the above object without lowering the efficiency (e.g., work efficiency) of image processing.

According to the present invention, the foregoing object is attained by providing an image processing apparatus having a function of connecting to the other apparatus, the image processing apparatus comprising a switch adapted to connect or disconnect a power input unit and a power circuit, and a power controller adapted to control the switch by using electric power supplied from the other apparatus.

In the image processing apparatus, the power input unit comprises a connector adapted to connect an AC power supply.

In the image processing apparatus, the power controller controls the switch on the basis of an instruction given by the other apparatus.

The image processing apparatus further comprises a main controller adapted to give an instruction concerning control of the switch to the power controller, wherein the power controller controls the switch on the basis of the instruction given by the main controller.

The image processing apparatus further comprises a main controller adapted to give an instruction concerning control of the switch to the power controller, wherein the power controller controls the switch on the basis of the instruction given by the main controller and an instruction given by the other apparatus.

In the image processing apparatus, the main controller operates by using electric power supplied from the power circuit.

In the image processing apparatus, the power controller controls the switch to a connected state on the basis of the instruction given by the other apparatus, and controls the switch to a disconnected state on the basis of the instruction given by the main controller and the instruction given by the other apparatus.

The image processing apparatus further comprises notifying unit adapted to notify the other apparatus of whether a predetermined operation is executable, wherein the power controller controls the switch on the basis of an instruction given by the other apparatus in response to the notification by the notifying unit.

In the image processing apparatus, the power controller controls the switch to the disconnected state on the basis of an instruction given by the other apparatus when a state in which a predetermined operation is unexecutable continues for not less than a predetermined time.

In the image processing apparatus, the main controller determines, on the basis of information given by the other apparatus, whether the other apparatus is able to execute a predetermined operation, and gives an instruction concerning control of the switch to the power controller on the basis of the determination.

In the image processing apparatus, when a state in which the other apparatus is unable to execute a predetermined operation continues for not less than a predetermined time, the main controller instructs the power controller to control the switch to the disconnected state.

The image processing apparatus further comprises a sensor adapted to sense a specific state, wherein the power controller controls the switch on the basis of an output from the sensor.

The image processing apparatus further comprises an image reader adapted to read an image, wherein the sensor senses an operation for starting image read, and the power controller controls the switch to the connected state on the basis of the output from the sensor.

In the image processing apparatus, the sensor operates by using electric power supplied from the other apparatus.

In the image processing apparatus, the image reader includes one of a press plate and a document feeder, and the sensor senses opening/closure of one of the press plate and the document feeder.

In the image processing apparatus, the image reader comprises an original platen, and the sensor senses that an original is placed on the original platen.

In the image processing apparatus, the image reader comprises a document feeder, and the sensor senses that an original is placed on the document feeder.

In the image processing apparatus, the other apparatus comprises an image output unit.

According to the present invention, the foregoing object is attained by providing an image processing apparatus having a function of connecting to another image processing apparatus including a switch adapted to connect or disconnect a power input unit to or from a power circuit, and a power controller adapted to control the switch, comprising a controller adapted to supply electric power to the power controller of the other image processing apparatus, and control the switch by controlling the power controller.

In the image processing apparatus, the controller determines on the basis of information given by the other image processing apparatus, whether the other image processing apparatus is able to execute a predetermined operation, and controls the power controller on the basis of the determination.

In the image processing apparatus, when a state in which the other image processing apparatus is unable to execute a predetermined operation continues for not less than a predetermined time, the controller so controls the power controller to set the switch to the disconnected state.

The image processing apparatus further comprises an image output unit.

According to the present invention, the foregoing object is attained by providing an image processing system in which first and second image processing apparatuses are connected, wherein the first image processing apparatus comprises a switch adapted to connect or disconnect a power input unit to or from a power circuit, and a power controller which operates by using an electric power supplied from the second image processing apparatus, and controls the switch on the basis of an instruction given by the second image processing apparatus, and the second image processing apparatus comprises a controller adapted to supply electric power to the first image processing apparatus and give an instruction concerning control of the switch to the first image processing apparatus.

In the image processing apparatus, the first image processing apparatus has a function of reading an image, and the second image processing apparatus has a function of outputting an image provided by the first image processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a timing chart showing the operation when the system according to the first embodiment of the present invention is powered on;

DETAILED DESCRIPTION OF THE PREFERRED EMBODIMENTS

Preferred embodiments of the present invention will now be described in detail with reference to the accompanying drawings.

First Embodiment

Figure 1:
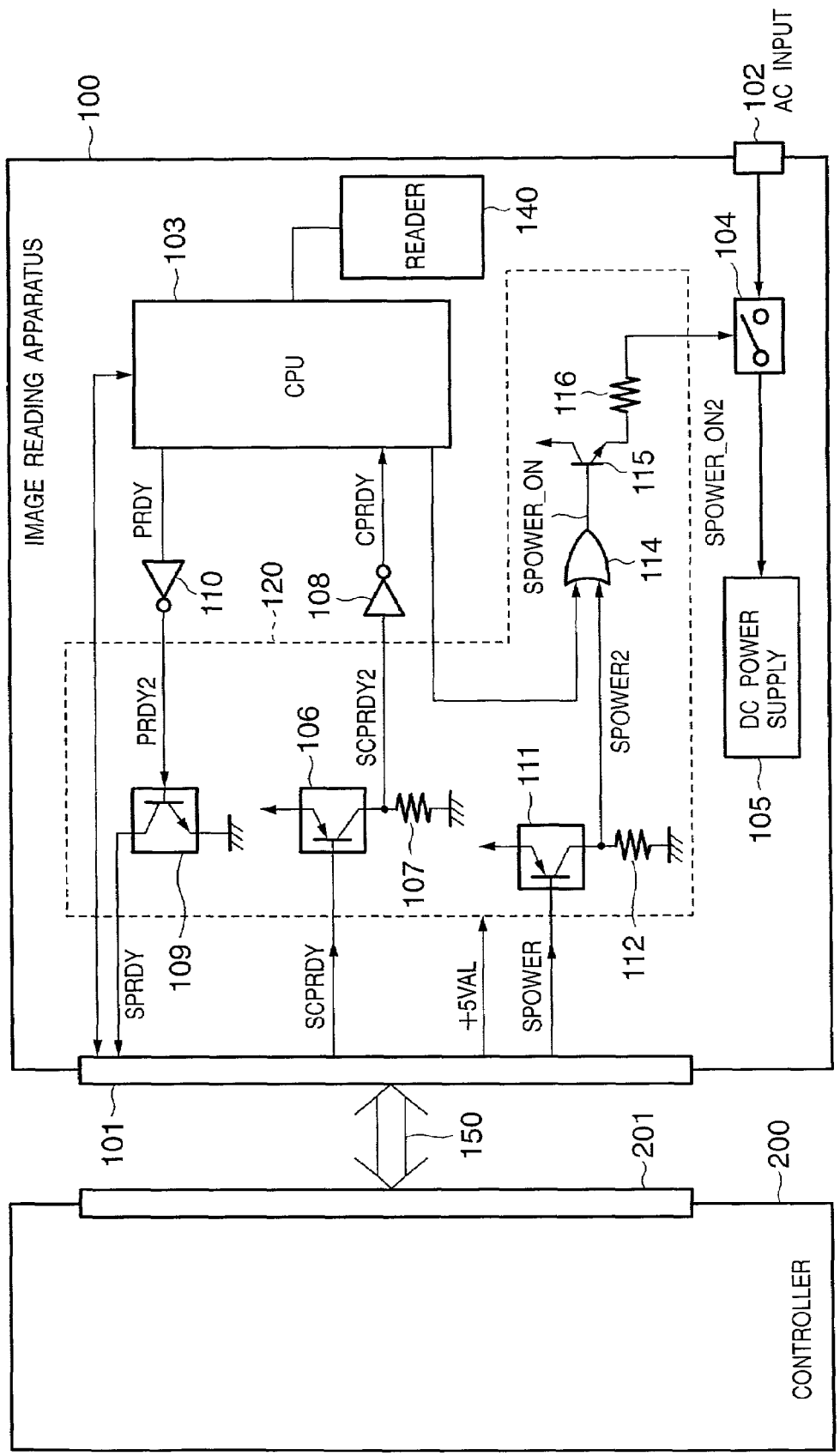
FIG. 1 is a view showing the configuration of an image reading apparatus (image processing apparatus) according to the first to sixth embodiments of the present invention.

FIG. 1 is a view showing the configuration of an image reading apparatus (image processing apparatus) according to preferred embodiments of the present invention. This image reading apparatus 100 includes a reader 140, an image processor, and the like. The reader 140 contains, e.g., a light source for illuminating an original and an image sensing device (e.g., a line sensor) for sensing an original image.

Figure 11:
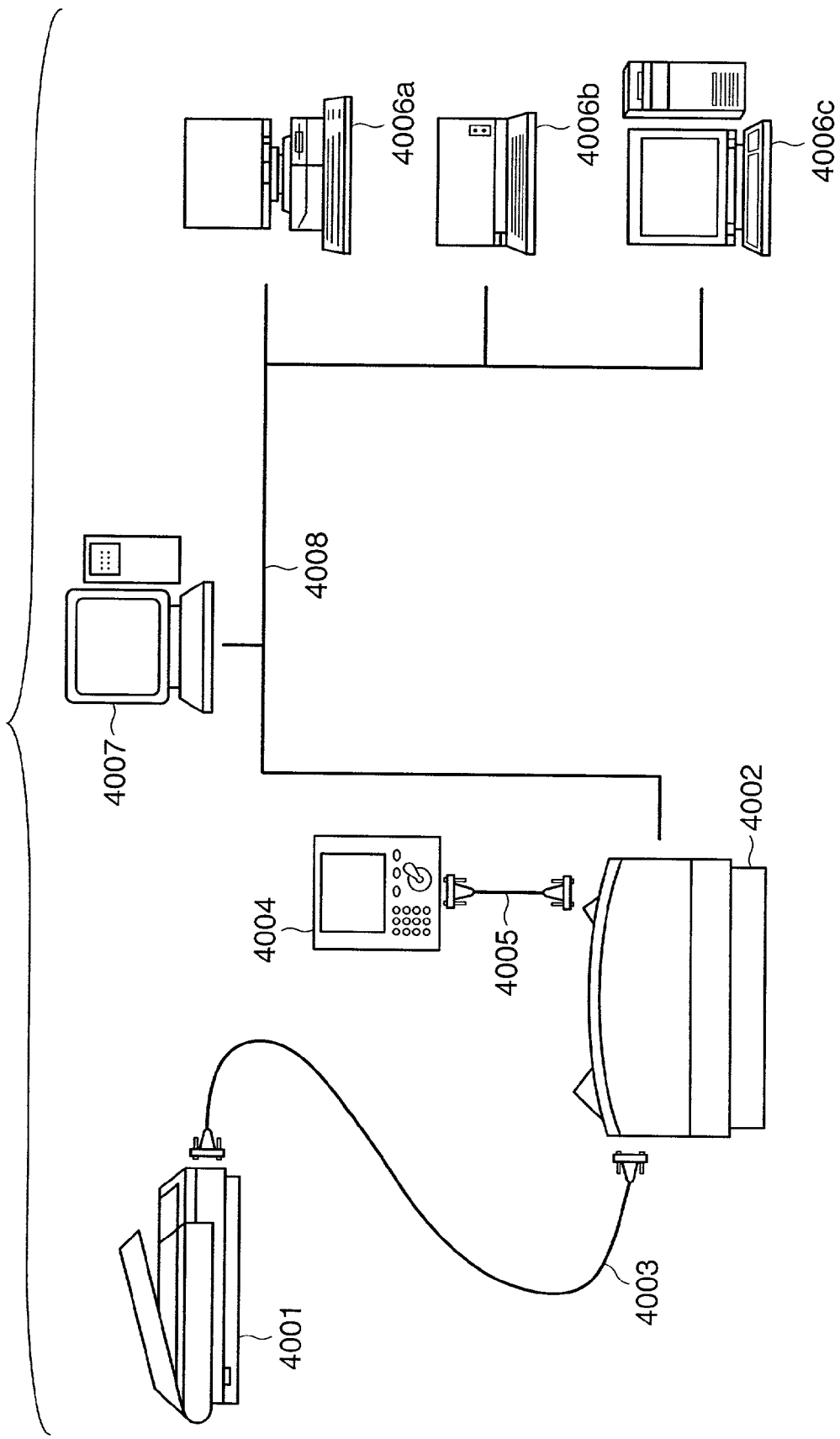
FIG. 11 is a view showing the configuration of a general digital copying system.

The components of the image reading apparatus 100 will be described below. A connector 101 connects this image reading apparatus 100 to the connector of a controller (image processing apparatus) 200 as another apparatus via a cable 150. When the image reading apparatus 100 and the controller 200 are applied to a digital copying system shown in FIG. 11, this image reading apparatus 100 can be used instead of the image scanner 4001, and the controller 200 can be used instead of the printer 4002 or as part of the printer 4002.

A connector (power input unit) 102 inputs electric power supplied from an AC power supply. A CPU (main controller) 103 controls the individual units (e.g., the reader 140 and a power control circuit 120) of the image reading apparatus 100. This CPU 103 has a function of controlling the power consumption of this image reading apparatus 100.

A switch 104 supplies and shuts off (closes and opens) electric power supplied from the connector 102 to a DC power supply 105. This switch 104 is controlled by the power control circuit 120. When a signal SPOWER_ON2 is at Hi level, the switch 104 is controlled to a power-supply state (connected). When the signal SPOWER_ON2 is at Lo level, the switch 104 is controlled to a shut-off state (disconnected).

Reference numeral 105 denotes a DC power supply mounted in the image reading apparatus 100. When the switch 104 is in the power-supply state, this DC power supply 105 converts a voltage supplied from the AC power supply into a DC voltage and provides this DC voltage to the individual units (e.g., the reader 140) in the image reading apparatus 100.

The power control circuit 120 controls the switch 104. This power control circuit 120 is driven by an all-night voltage +5VAL supplied from the controller 200 via the cable 150 and the connector 101.

A signal SCPRDY indicates the status of the controller 200. When at Hi level, this signal SCPRDY indicates that the controller 200 is inoperable. When at Lo level, the signal SCPRDY indicates that the controller 200 is operable. The power control circuit 120 generates a signal SCPRDY2 by inverting the signal SCPRDY.

A signal SPRDY indicates the status of the image reading apparatus 100. When at Hi level, this signal SPRDY indicates that the image reading apparatus 100 is inoperable. When at Lo level, the signal SPRDY indicates that the image reading apparatus 100 is operable. This signal SPRDY is controlled by a signal PRDY2 formed by inverting a signal PRDY which is generated by the CPU 103. The signal SPRDY is driven by an open collector driver.

A signal SPOWER is supplied from the controller 200 via the cable 150 and the connector 101 to control the DC power supply of the image reading apparatus 100. This signal SPOWER is an activation signal which, when at Lo level, turns on the power supply of the image reading apparatus 100 (i.e., sets the switch 104 in the power-supply state, thereby supplying electric power supplied from the AC power supply to the DC power supply 105, and allowing the DC power supply 105 to apply the DC voltage to the individual units).

The power control circuit 120 generates a signal SPOWER_ON which is the logical sum (OR) of a signal SPOWER2 as an inverted signal of the signal SPOWER and a signal POWER_LIVE generated by the CPU 103. In accordance with this signal SPOWER_ON, the power control circuit 120 generates the signal SPOWER_ON2 for controlling the switch 104, thereby controlling the switch 104 with this signal.

Reference numeral 106 denotes a resistor-containing PNP transistor. When the base input is at Lo level, this transistor 106 is turned on, and the signal SCPRDY is input to the base. Reference numeral 107 denotes a resistor connected to the collector of the transistor 106 to generate the signal SCPRDY2; and 108, an inverter for inverting the signal SCPRDY2. As this inverter 108, a device capable of receiving a signal having a higher voltage than the power supply voltage (the voltage applied from the DC power supply 105) is used.

Reference numeral 109 denotes a resistor-containing NPN transistor. When the base input is at Hi level, this transistor 109 is turned on, the signal PRDY2 is input to the base, and the signal SPRDY driven by an open collector driver is output to the controller 200 via the connector 101.

An inverter 110 inverts the output PRDY signal from the CPU 103. The inverted signal is input as the signal PRDY2 to the base of the transistor 109.

Reference numeral 111 denotes a resistor-containing PNP transistor. When the base input is at Lo level, this transistor 111 is turned on, and the signal SPOWER is input to the base.

A resistor 112 is connected to the collector of the transistor 111 to generate the signal SPOWER2.

Reference numeral 114 denotes a 2-input OR gate. This OR gate 114 receives the signal SPOWER2 and the signal POWER_LIVE generated by the CPU 103, and outputs the signal SPOWER_ON.

Reference numeral 115 denotes an NPN transistor. This transistor 115 drives the switch 104 with an electric current, and the signal SPOWER_ON is input to the base.

Reference numeral 116 denotes a current-controlled resistor connected to the emitter of the transistor 115. The signal SPOWER_ON2 is supplied to the switch 104 via this resistor 116.

Figure 2:
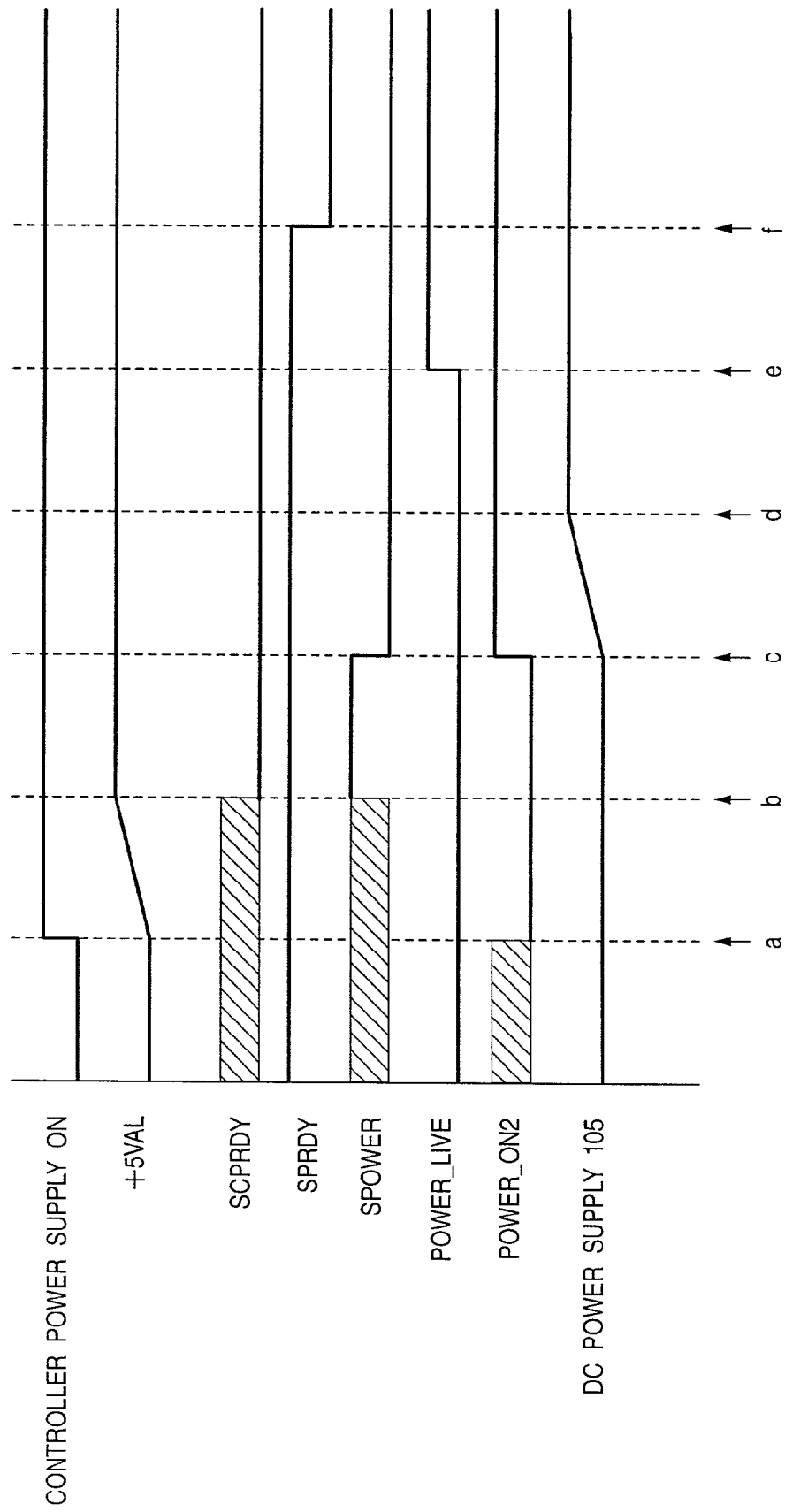

Power control upon activation of the image reading apparatus 100 with the above arrangement will be described below with reference to FIG. 2. FIG. 2 is a timing chart showing the operation when the system is powered on. An operation at each timing shown in FIG. 2 will be explained.

Point a: Turn on of System Power Supply

The power supply of the controller 200 is turned on to start activating the all-night voltage +5VAL to be applied to the image reading apparatus 100.

Point b: Activation of All-Night Voltage +5VAL

At the same time the all-night voltage +5VAL is activated, the controller 200 controls the signal SCPRDY to Lo level and the signal SPOWER to Hi level.

In the power control circuit 120 of the image reading apparatus 100, the signals SCPRDY and SPOWER supplied via the connector 101 function as follows.

Since the signal SPOWER is at Hi level, the transistor 111 is turned off, and the signal SPOWER2 to be supplied to the OR gate 114 changes to Lo level. In this case, the DC power supply 105 is OFF, so no electric power is supplied to the CPU 103. Therefore, the signal POWER_LIVE supplied to the other input terminal of the OR gate 114 is also at Lo level, so the signal SPOWER_ON changes to Lo level. Accordingly, the transistor 115 is turned off, the switch 104 is controlled to the shut-off state, and only the power control circuit 120 consumes power in the image reading apparatus 100.

Since the signal SCPRDY is at Lo level, the transistor 106 is turned on, and Hi level is output to the signal SCPRDY2. However, the status of the image reading apparatus 100 remains unchanged because no electric power is supplied to the inverter 108.

Point c: Power Supply Instruction From Controller

The signal SPOWER is controlled to Lo level, the transistor 111 is turned on, and the signals SPOWER2 and SPOWER_ON are controlled to Hi level. The switch 104 is controlled to the power-supply state, and the AC power is supplied to the DC power supply 105 to start activating the power supply (DC power supply 105) of the image reading apparatus.

Point d: Completion of Activation of Power Supply of Image Reading Apparatus

The activation of the DC power supply 105 is completed, and the electric power is supplied to the CPU 103, the inverters 108 and 110, the reader 140, and the like. In response to this, the CPU 103 loads a program from a program ROM (not shown) to start activating the image reading apparatus 100.

Point e: Control of Signal POWER_LIVE

As part of the activation process, the CPU 103 controls the signal POWER_LIVE to Hi level. Consequently, both inputs of the OR gate 114 change to Hi level. Accordingly, the power-supply state of the switch 104 is maintained by double control by the signal SPOWER supplied from the controller 200 and the signal POWER_LIVE generated by the CPU 103.

Point f: Notification of Activation Completion of Image Reading Apparatus

The CPU 103 detects on the basis of Lo level of the signal CPRDY that the controller 200 is activated. In addition, the CPU 103 outputs Lo level to the signal PRDY to turn on the transistor 109, thereby controlling the signal SPRDY to Lo level to notify the controller 200 that the image reading apparatus 100 is activated.

In this manner, the operation of activating the power supply of the image processing apparatus 100 is completed. As described above, the switch 104 for controlling supply of AC power to the DC power supply 105 is controlled by the power control circuit 120 which is driven by the all-night voltage +5VAL applied from the controller 200 as an external device. This allows the image reading apparatus 100 to reduce consumption of not only the secondary power (the power consumed at the output side of the DC power supply 105) but also the primary power (the power consumed at the input side of the DC power supply 105). Consequently, low power consumption of the whole system can be realized.

Second Embodiment

Figure 3:
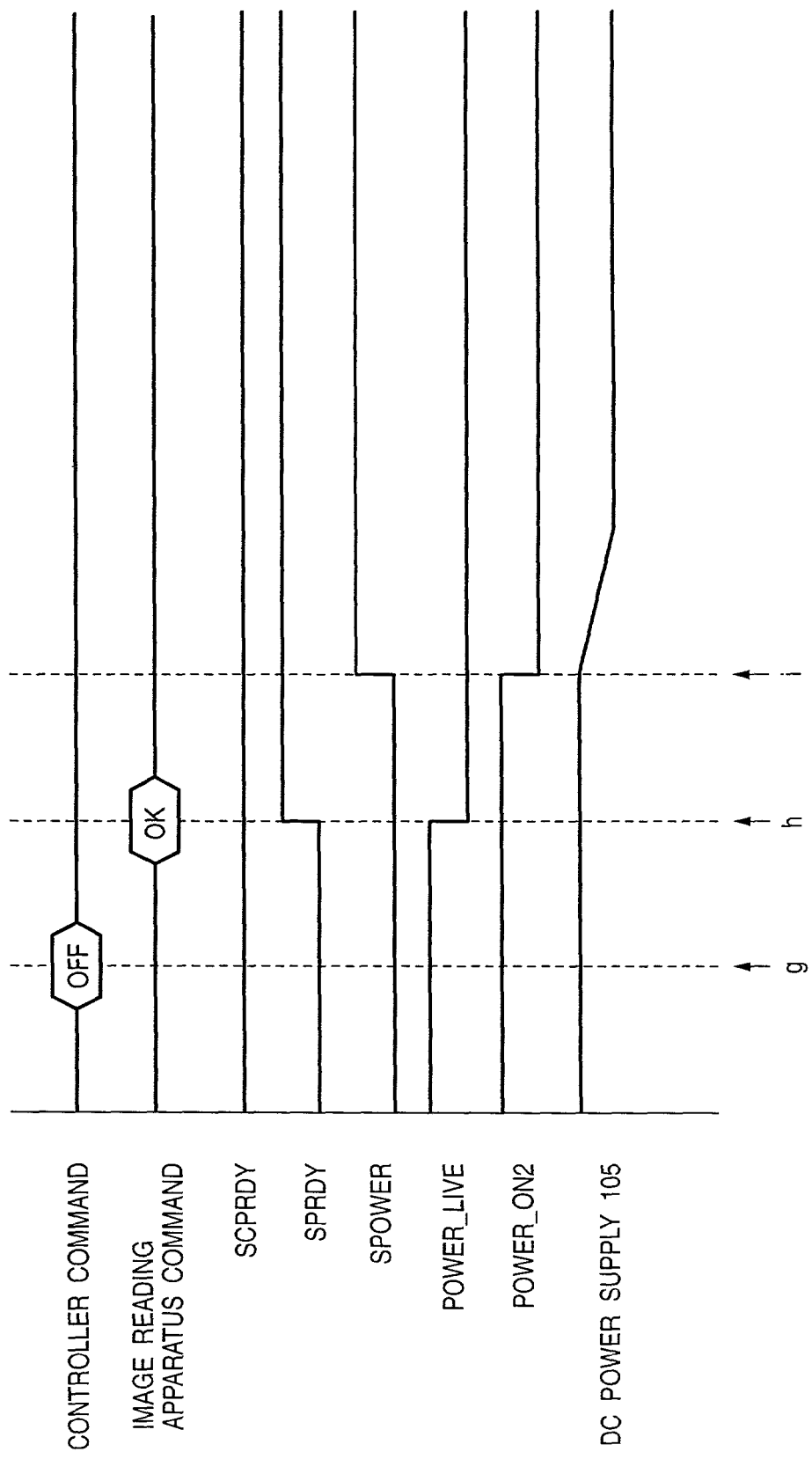
FIG. 3 is a timing chart showing the operation when the power supply is turned off in the second embodiment of the present invention.

FIG. 3 is a timing chart, according to the second embodiment of the present invention, when the power supply of an image reading apparatus 100 shown in FIG. 1 is turned off (supply of power to a DC power supply 105 is shut off) in accordance with instructions from a controller 200. An operation at each timing shown in FIG. 3 will be described below. Matters not particularly mentioned in this embodiment are the same as in the first embodiment.

Point g: Transmission of Power OFF Command from Controller

For example, electric power consumed by the image reading apparatus 100 while a large amount of printing is executed in accordance with print data provided by a computer device is wasteful power.

As described earlier, the state in which supply of the AC power to the DC power supply 105 is shut off by a switch 104 is the state in which the power consumed by the image reading apparatus 100 is minimized.

Accordingly, to minimize the power consumption of the system, the controller 200 turns off the power supply of the image reading apparatus 100 (shuts off supply of the AC power to the DC power supply 105).

A CPU 103 receives a power OFF command transmitted from the controller 200. In response to this command, the CPU 103 begins terminating the operation of the image reading apparatus 100. This termination process includes, e.g., a backup process of saving adjustment parameters in a nonvolatile memory. This backup process is executed to allow rapid activation of the image reading apparatus 100 at the next opportunity.

Point h: Transmission of Power Shut-Off OK Command to Controller

After the completion of the termination process, the CPU 103 controls a signal POWER_LIVE to Lo level. Consequently, the DC power supply 105 is controlled only with a signal SPOWER driven by the controller 200.

Simultaneously, the CPU 103 controls a signal SPRDY to Hi level by controlling a signal PRDY to Hi level, thereby informing the controller 200 that the image reading apparatus 100 is in the state (inoperative state) in which the image reading apparatus 100 can be powered off, i.e., the DC power supply 105 can be turned off (supply of the AC power to the DC power supply 105 can be shut off).

Point i: Shut off of DC Power Supply

The controller 200 receives the power shut-off OK command transmitted from the image reading apparatus 100, and confirms on the basis of the signal SPRDY that the image reading apparatus 100 is inoperative. After that, the controller 200 controls the signal SPOWER to Hi level. Consequently, both inputs of an OR gate 114 change to Lo level, so a signal SPOWER_ON2 is controlled to Lo level. Accordingly, the switch 104 shuts off supply of the AC power to the DC power supply 105, completing the power shut-off operation of the image reading apparatus 100.

In this embodiment, the controller 200 controls shut-off of supply of power to the image reading apparatus 100 where necessary. This prevents unnecessary consumption of power by the image reading apparatus 100, so low power consumption of the whole system can be realized.

Note that the power supply of the image reading apparatus 100 can be turned off by the controller 200 on the basis of not only the above-mentioned factor (printing based on instructions from a computer device) but also other various factors.

Third Embodiment

Figure 4:
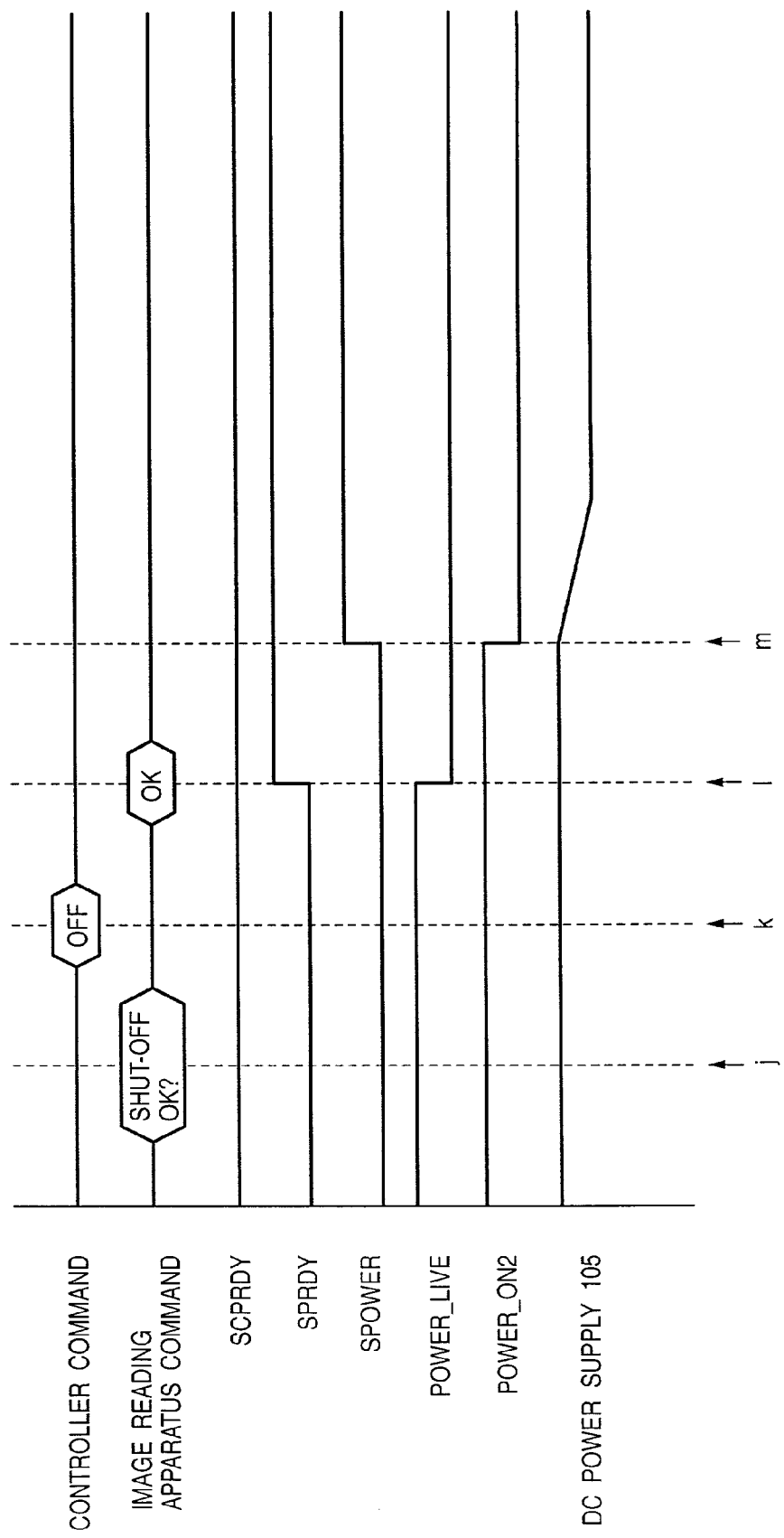
FIG. 4 is a timing chart showing the operation when the power supply is turned off in the third embodiment of the present invention.

FIG. 4 is a timing chart, according to the third embodiment of the present invention, when an image reading apparatus 100 shown in FIG. 1 turns off its power supply in accordance with its own determination. An operation at each timing shown in FIG. 4 will be described below. Matters not particularly mentioned in this embodiment are the same as in the first embodiment.

Point j: Transmission of Power Shut-Off Confirmation Command to Controller

The image reading apparatus 100 has a function of turning off its power supply (shutting off supply of electric power to a DC power supply 105) if no read operation is executed for a predetermined time or more (the state of transition to a so-called standby state or sleep state), or at a preset time (e.g., the start time of a lunch break).

To turn off its power supply, the image reading apparatus 100 transmits a power shut-off confirmation command to a controller 200.

Point k: Transmission of Power Shut-Off Command from Controller

The controller 200 receives the power shut-off confirmation command transmitted from the image reading apparatus 100. On the basis of, e.g., information related to the frequency of use by the user, the controller 200 determines whether the power supply of the image reading apparatus 100 can be turned off. If determining that the power supply is to be turned off, the controller 200 transmits a power shut-off command to the image reading apparatus 100.

The operation at this point k is analogous to that at the point g in FIG. 3.

Operations at subsequent points l and m are similar to those at the points h and i, respectively, in FIG. 3.

In this embodiment as described above, the image reading apparatus 100 turns off its own power supply (the controller 200 permits this) in accordance with its own determination. Consequently, low power consumption of the whole system can be realized.

Note that the power supply of the image reading apparatus 100 can be turned off by its own determination on the basis of not only the above-mentioned factor (i.e., when no image read operation is executed for a predetermined time or more) but also other various factors.

Fourth Embodiment

Figure 5:
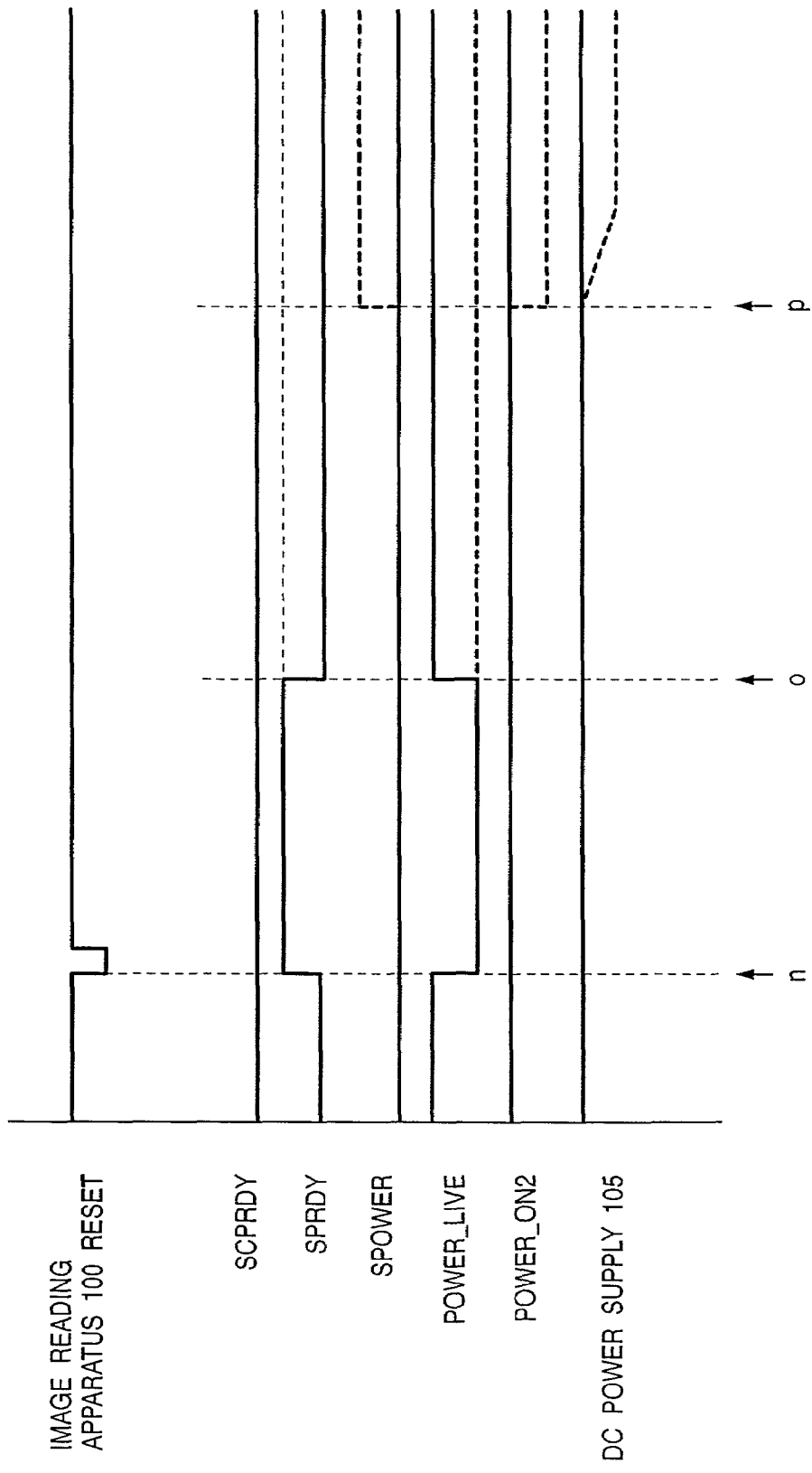
FIG. 5 is a timing chart showing a restoring operation when an image reading apparatus is reset in the fourth embodiment of the present invention.

FIG. 5 is a timing chart for explaining the operation when an image reading apparatus 100 shown in FIG. 1 is reset by an unexpected event, according to the fourth embodiment of the present invention. Matters not particularly mentioned in this embodiment are the same as in the first embodiment.

Referring to FIG. 5, each solid line indicates an operation when the system of the image reading apparatus 100 is normally restored after reset. Each dotted line indicates an operation when the system of the image reading apparatus 100 is not normally restored after reset.

An operation at each timing shown in FIG. 5 will be described below.

Point n: Occurrence of Reset in Image Reading Apparatus 100

A CPU 103 of the image reading apparatus 100 has a function of resetting its own system (image reading function) by hardware if an image read operation is hindered by a device failure or extreme external stress (e.g., vibration).

When reset occurs, a signal SPRDY is forcedly controlled to Hi level. Simultaneously, a signal POWER_LIVE as a power control signal is forcedly controlled to Lo level.

When the signal SPRDY changes to Hi, a controller 200 detects that the image reading apparatus 100 is inoperable. Hence, the controller 200 operates an internal counter to start counting a preset system restoration time of the image reading apparatus 100. Also, the controller 200 informs the user that the image reading apparatus 100 is incapable of image read, by using an output unit (e.g., a display or speaker) that is not shown. Even in this state, the controller 200 can perform a printing process (printing based on instructions from a computer device).

Meanwhile, the power-supply state of a switch 104 for supplying power to a DC power supply 105 is maintained by a signal SPOWER input from the controller 200, even when the signal POWER_LIVE changes to Lo level.

Point o: Restoration of Image Reading Apparatus 100

The system of the image reading apparatus 100 is normally restored. The CPU 103 controls the signal SPRDY to Lo level and the signal POWER_LIVE to Hi level. Consequently, the switch 104 for supplying electric power to the DC power supply 105 returns to the power-supply state by double control by the CPU 103 and the controller 200.

When the signal SPRDY changes to Lo level, the controller 200 detects that the image reading apparatus 100 is operable. Therefore, the controller 200 informs the user that the image reading apparatus 100 is capable of image read, by using the output unit (not shown) described above.

Point p: Shut-Off of Power Supply of Image Reading Apparatus

After reset occurs in the image reading apparatus 100, the signals SPRDY and POWER_LIVE are kept at Hi and Lo levels, respectively.

If the SPRDY signal is at Hi level when the counter which started counting at the point n has counted the preset system restoration time (e.g., 60 sec), the controller 200 determines that the system of the image reading apparatus 100 has a problem. Therefore, the controller 200 controls the signal SPOWER to Hi level in order to forcedly turn off the power supply of the image reading apparatus 100.

Since the signal SPOWER_LIVE is at Lo level and the signal SPOWER is at Hi level, the switch 104 shuts off supply of AC power to the DC power supply 105, thereby forcedly turning off the power supply of the image reading apparatus 100.

At the same time, the controller 200 informs the user of the occurrence of the trouble in the system of the image reading apparatus 100, by using the aforementioned output device.

In this embodiment, appropriate power control corresponding to the status of the image reading apparatus 100 can be performed. Accordingly, low power consumption of the entire system can be realized.

Fifth Embodiment

Figure 6:
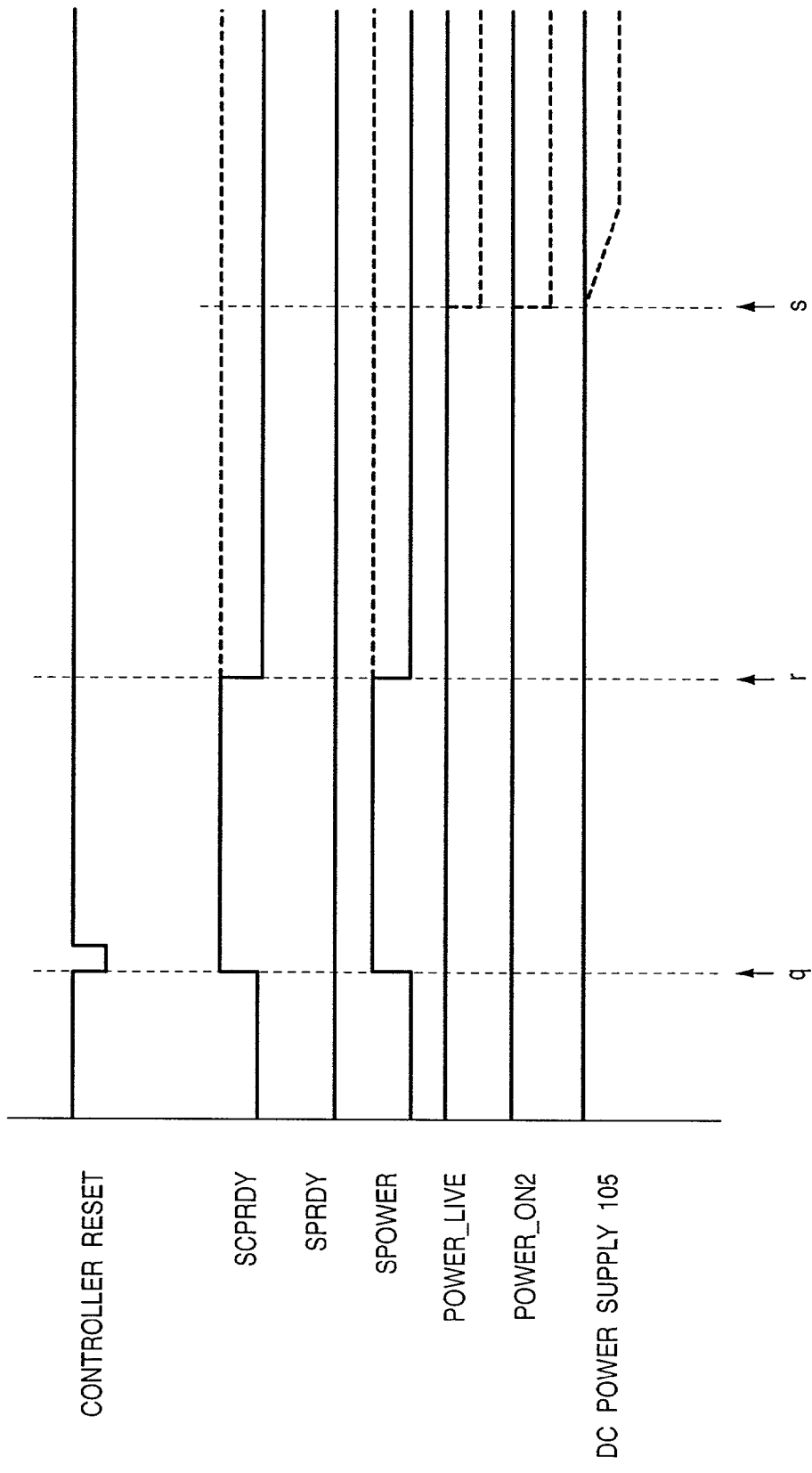
FIG. 6 is a timing chart showing a restoring operation when a controller is reset in the fifth embodiment of the present invention.

FIG. 6 is a timing chart for explaining the operation when a controller 200 shown in FIG. 1 is reset by an unexpected event, according to the fifth embodiment of the present invention. Matters not particularly mentioned in this embodiment are the same as in the first embodiment.

Referring to FIG. 6, each solid line indicates an operation when the system of an image reading apparatus 100 is normally restored after reset. Each dotted line indicates an operation when the system of the image reading apparatus 100 is not normally restored after reset.

An operation at each timing shown in FIG. 6 will be described below.

Point q: Occurrence of Reset in Controller

The controller 200 has a function of resetting its own system by hardware if the operation is hindered by a device failure or extreme external stress (e.g., vibration).

When reset occurs, the controller 200 forcedly controls a signal SCPRDY to Hi level and a signal SPOWER as a power control signal to Lo level. In addition, the controller 200 informs the user that the controller 200 is inoperable, by using an output unit (e.g., a display or speaker) that is not shown.

When the signal SCPRDY changes to Hi level, the image reading apparatus 100 detects that the controller 200 is inoperable. Therefore, the image reading apparatus 100 operates the internal counter of a CPU 103 to start counting a preset system restoration time of the controller 200.

Meanwhile, the power-supply state of a switch 104 for supplying electric power to a DC power supply 105 is maintained by a signal POWER_LIVE input from the CPU 103 even after the signal SPOWER changes to Hi level.

Point r: Restoration of Controller

The system of the controller 200 is normally restored. The controller 200 controls the signal SCPRDY to Lo level and the signal SPOWER to Hi level. Simultaneously, the controller 200 uses the output unit described above to inform the user that the controller 200 is operable.

When the signal SCPRDY changes to Lo level, the image reading apparatus 100 detects that the controller 200 is operable.

The switch 104 for supplying electric power to the DC power supply 105 returns to the power-supply state by double control by the CPU 103 and the controller 200.

Point s: Shut-Off of Power Supply of Image Reading Apparatus

If the system is not normally restored after reset occurs in the controller 200, the signals SCPRDY and SPOWER are kept at Hi level.

If the SCPRDY signal is at Hi level when the counter which started counting at the point q has counted the preset system restoration time (e.g., 60 sec), the image reading apparatus 100 determines that the system of the controller 200 has a problem. Therefore, the image reading apparatus 100 controls the signal POWER_LIVE to Lo level in order to forcedly turn off its own power supply.

Since the signal SPOWER_LIVE is at Lo level and the signal SPOWER is at Hi level, the switch 104 shuts off supply of AC power to the DC power supply 105, thereby forcedly turning off the power supply of the image reading apparatus 100.

In this embodiment, appropriate power control corresponding to the status of the controller 200 can be performed. Accordingly, low power consumption of the entire system can be realized.

Sixth Embodiment

Figure 7:
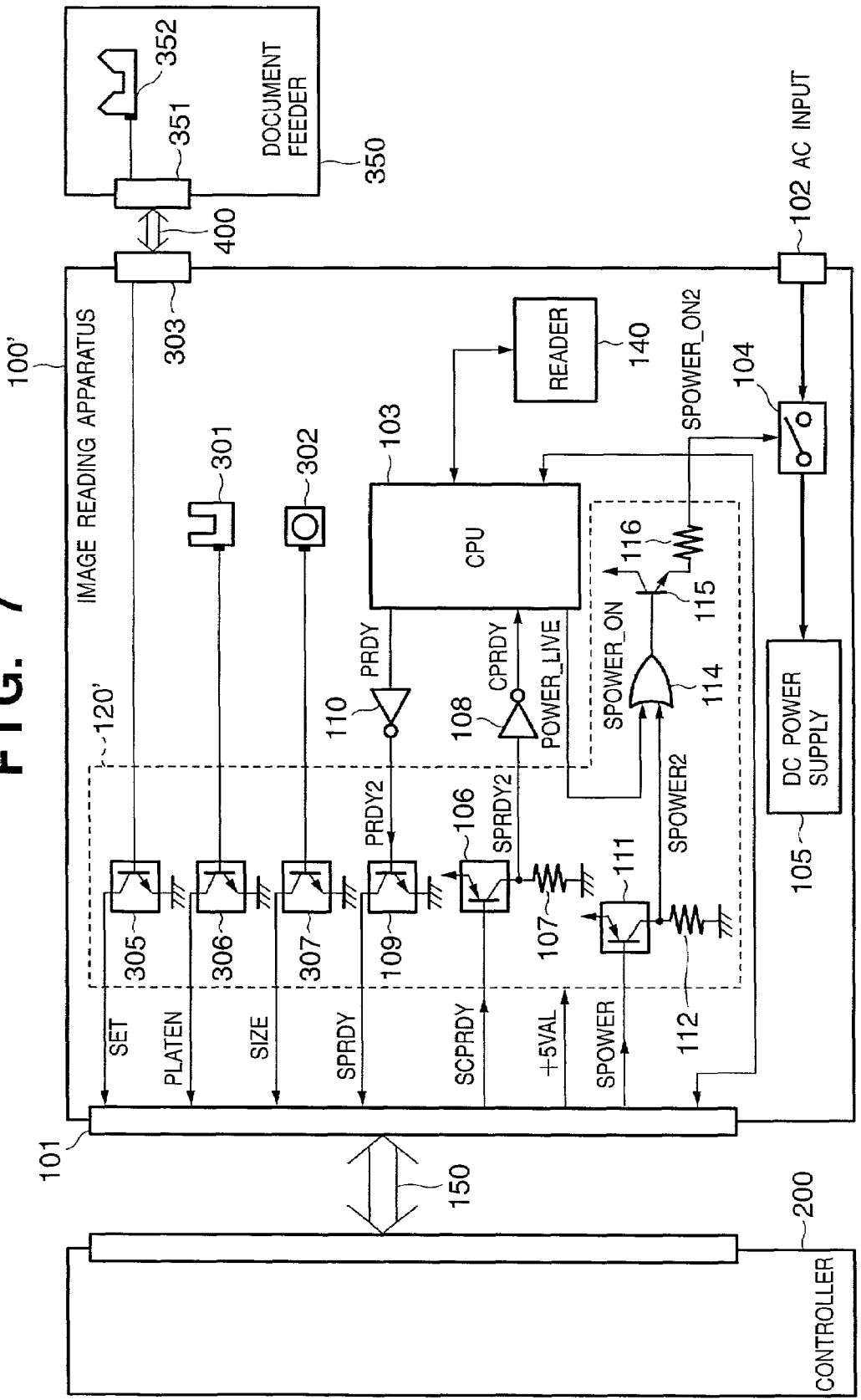
FIG. 7 is a view showing the configuration of an image reading apparatus according to the sixth embodiment of the present invention.

FIG. 7 is a view showing the configuration of an image reading apparatus according to the sixth embodiment of the present invention. The same reference numerals as in FIG. 1 denote the same parts in FIG. 7, and a description thereof will be omitted to avoid a repetitive explanation.

A document feeder 350 is mounted, if necessary, in the upper portion of an image reading apparatus 100' to automatically feed originals. This document feeder 350 is connected to the image reading apparatus 100' via a cable 400. The document feeder 350 is powered by a DC power supply 105 of the image reading apparatus 100' via the cable 400. A connector 351 connects the document feeder 350 and the image reading apparatus 100'.

A reflective sensor 352 for sensing original placement senses whether an original is placed on the document feeder 350. This original placement sensor 352 is driven by an all-night voltage +5VAL supplied from a power control circuit 120'. The original placement sensor 352 outputs Hi level when sensing the placement of an original, and Lo level in other cases.

Reference numeral 301 denotes a press plate sensor mounted on the image reading apparatus 100'. A press plate (not shown) for pressing an original or the document feeder 350 is mounted on the image reading apparatus 100'. The press plate sensor 301 senses whether the press plate or the document feeder 350 is closed. The operation of this press plate sensor 301 remains unchanged regardless of whether the press plate or the document feeder 350 is mounted. Therefore, a case where the document feeder 350 is mounted will be explained.

The press plate sensor 301 outputs Hi level when the document feeder 350 is closed, and Lo level when it is open. Also, the press plate sensor 301 is driven by the all-night voltage +5VAL, similar to the original placement sensor 352.

Reference numeral 302 denotes a reflective sensor for sensing the original size. The image reading apparatus 100' has an original glass plate (not shown) on which an original is placed. A plurality of original size sensors 302 are arranged below this original glass plate, and the original size is sensed in accordance with the combination of the results of sensing. In this embodiment, these original size sensors 302 are used to check whether an original is placed on the original glass plate, i.e., to check the presence/absence of an original. Each original size sensor 302 outputs Hi level when an original is placed on the original glass plate, and outputs Lo level when there is no original. These original size sensors 302 are also driven by the all-night voltage +5VAL.

A connector 303 connects the image reading apparatus 100' and the document feeder 350.

Reference numerals 305, 306, and 307 denote resistor-containing NPN transistors. The bases of these transistors 305, 306, and 307 receive outputs from the original placement sensor 352, the press plate sensor 301, and the original size sensors 302, respectively. The transistors 305, 306, and 307 are turned on when their bases are at Hi level.

These transistors 305, 306, and 307 drive their output terminals by an open collector driver, and supply output signals SET, PLATEN, and SIZE, respectively, to a controller 200 via a connector 101.

The signal SET is at Lo level when the output from the original placement sensor 352 is at Hi level. The signal PLATEN is at Lo level when the output from the press plate sensor 301 is at Hi level. The signal SIZE is at Lo level when the output from the original size sensor 302 is at Hi level.

In the above arrangement, the image reading apparatus 100' is always in a power shut-off state when standing by. A switch 104 is controlled to a power-supply state only when image read is executed. One characteristic feature of this embodiment is the control of restoration from the power shut-off state. Details of the control will be described below.

In an image reading apparatus used as part of a digital copying machine or the like, image read is generally started by any of the following five procedures (operations).

(Procedure 1) After an original is placed on a document feeder and the copying conditions (e.g., magnification and copy quantity) are set, a copy start switch is turned on.

(Procedure 2) A closed document feeder is opened, an original is placed on an original glass plate, the document feeder is closed, and the copying conditions (e.g., magnification and copy quantity) are set. After that, a copy start switch is turned on.

(Procedure 3) A closed document feeder is opened, and an original is placed on an original glass plate. After the copying conditions (e.g., magnification and copy quantity) are set with the document feeder kept open, a copy start switch is turned on.

(Procedure 4) An original is placed on an original glass plate with a document feeder being open, the document feeder is closed, and the copying conditions (e.g., magnification and copy quantity) are set. After that, a copy start switch is turned on.

(Procedure 5) An original is placed on an original glass plate with a document feeder being open, and the copying conditions (e.g., magnification and copy quantity) are set with the document feeder kept open. After that, a copy start switch is turned on.

Figure 8:
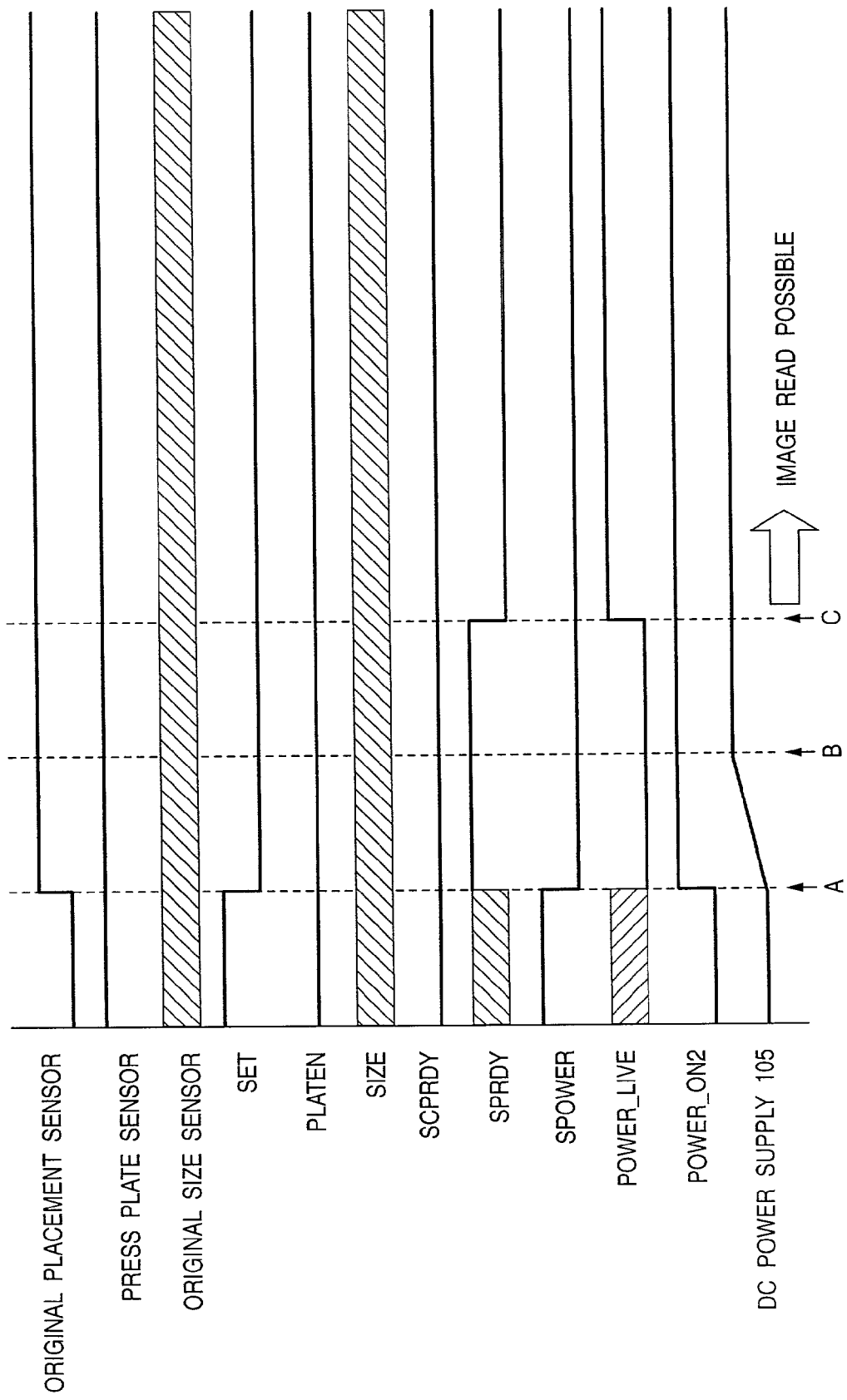
FIG. 8 is a timing chart showing the operation of activating the image reading apparatus with its power supply being turned off.

FIG. 8 is a timing chart showing the operation of starting the image reading apparatus 100 in the power shut-off state, when image read is to be performed following (procedure 1). An operation at each timing shown in FIG. 8 will be explained.

Point A: ON of Original Placement Sensor

The document feeder 350 is closed in the upper portion of the image reading apparatus 100, and the output from the press plate sensor 301 is fixed at Hi level. Although the output from each original size sensor 302 changes in accordance with the state of the feeding surface of the document feeder 350, the level of the output is fixed.

When a user places an original on a paper feed tray of the document feeder 350, the output from the original placement sensor 352 changes from Lo to Hi level, the transistor 305 is turned on, and the signal SET changes from Hi to Lo level.

On the basis of this change of the signal SET, the controller 200 determines that the user has started the work for image read. Therefore, the controller 200 controls a signal SPOWER to Lo level to start activating the power supply of the image reading apparatus 100.

Point B: Completion of Activation of Power Supply

Point C: Transition to Image Read Possible State

After the activation of the DC power supply is completed, a CPU 103 controls a signal SPRDY to Lo level to inform the controller 200 that image read is possible. At the same time, the CPU 103 controls a signal POWER_LIVE to Hi level to perform ON control of the DC power supply 105 by double control.

From a point C, the image reading apparatus 100 is capable of image read.

When a user designates the start of image read, it usually takes at least about 5 sec to place an original on the document feeder 350, set conditions, and begin reading. Therefore, by performing the operation from A to C within 5 sec, image read can be performed without giving any stress to the user even if the power supply of the image reading apparatus 100 is always OFF in a standby state. It is also possible to minimize the power consumed by the image reading apparatus 100.

Figure 9:
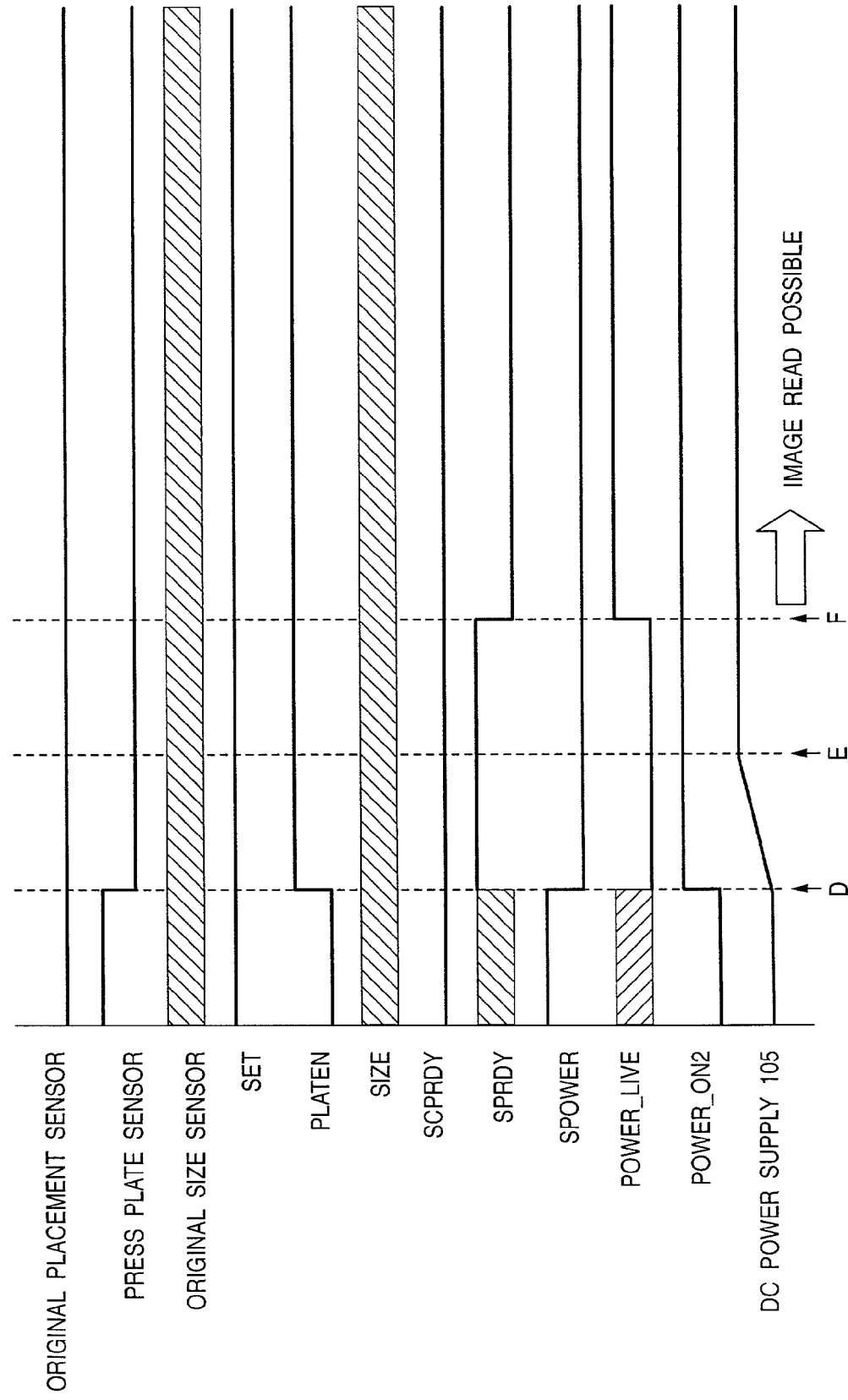
FIG. 9 is a timing chart showing the operation of activating the image reading apparatus with its power supply being turned off.

FIG. 9 is a timing chart showing the operation of activating the image reading apparatus 100 in a power shut-off state, when image read is to be executed following (procedure 2) and (procedure 3). An operation at each timing shown in FIG. 9 will be described below.

Point D: ON of Original Placement Sensor

A user opens the document feeder 350 that is closed. The output from the press plate sensor 301 changes from Hi to Lo level, and the signal PLATEN changes from Lo to Hi level. In this state, the output from the original placement sensor 352 is fixed at Lo level. Although the output from each original size sensor 302 changes in accordance with the placement of an original on the original glass plate, the output timing is after the point D.

On the basis of the earliest change of the signal PLATEN, the controller 200 determines that the user has started the work for image read. Accordingly, the controller 200 controls the signal SPOWER to Lo level to begin activating the power supply of the image reading apparatus 100.

Completion of the power supply activation at a point E and an image read enable timing at a point F are similar to the points B and C, respectively, shown in FIG. 8.

Compared to (procedure 1), (procedure 2) and (procedure 3) require the operation of opening the document feeder 350, so the time from the start of operation to the start of copying additionally requires about 2 sec. Accordingly, a time of about 7 sec is necessary for a user to designate the start of image read.

Although the sensors for sensing the start of the work for image read are different, the timings shown in FIG. 9 are identical in operation after sensing. In (procedure 2) and (procedure 3), therefore, it is possible to execute image read without giving any stress to the user and minimize the power consumed by the image reading apparatus 100.

Figure 10:
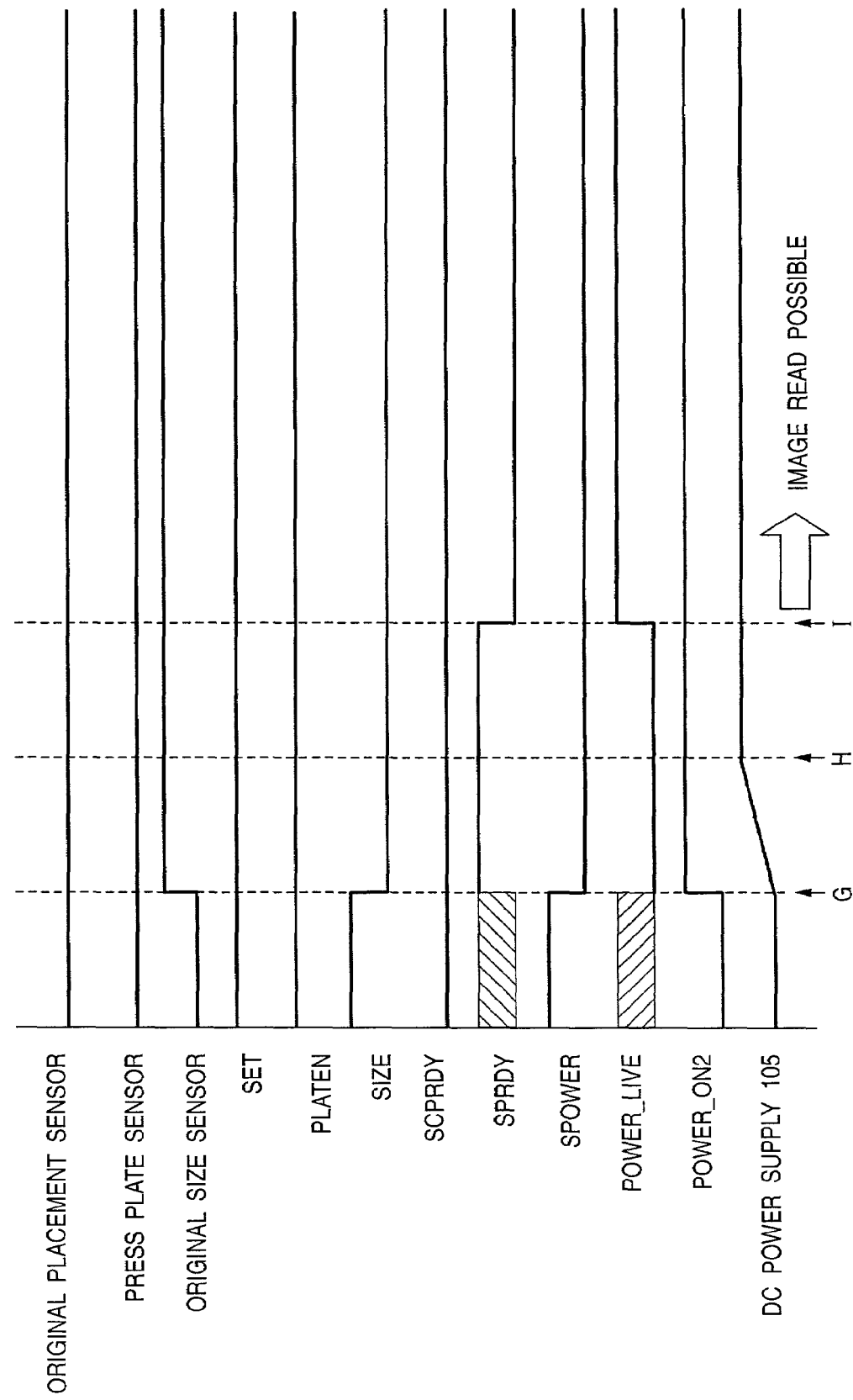
FIG. 10 is a timing chart showing the operation of activating the image reading apparatus with its power supply being turned off.

FIG. 10 is a timing chart showing the operation of starting the image reading apparatus 10 in a power shut-off state, when image read is to be executed following (procedure 4) and (procedure 5). An operation at each timing shown in FIG. 10 will be described below.

Point G: ON of Original Size Sensor

Since the document feeder 350 is open, the user starts the work for image read by placing an original on the original glass plate. Consequently, the original size sensor 302 changes from Lo to Hi level, and the signal SIZE changes from Hi to Lo level.

In this state, the output from the press plate sensor 301 is fixed at Lo level, and the output from the original placement sensor 352 is fixed at Lo level.

On the basis of the earliest change of the signal SIZE, the controller 200 determines that the user has started the work for image read. Therefore, the controller 200 controls the signal SPOWER to Lo level to start activating the power supply of the image reading apparatus 100.

Completion of the power supply activation at a point H and the image read enable timing at a point I are analogous to the points B and C, respectively, shown in FIG. 8.

In (procedure 4) and (procedure 5), the procedure of placing an original on the original glass plate is substantially the same as the procedure of placing an original on the document feeder 350 in (procedure 1). Hence, a time of at least about 5 sec is necessary from the start of the work to the start of copying, in substantially the same as in (procedure 1).

Although the sensors for sensing the start of the work for image read are different, the timings shown in FIG. 10 are identical in operation after sensing. In (procedure 4) and (procedure 5), therefore, it is possible to execute image read without giving any stress to the user and minimize the power consumed by the image reading apparatus 100.

Other Embodiment

The present invention can be applied to a system constituted by a plurality of devices or to an apparatus comprising a single device.

Further, the objects of the present invention can also be achieved by supplying a storage medium (or a recording medium) storing program codes of software for implementing the functions of the above embodiments to a system or an apparatus, and reading out and executing the program codes stored in the storage medium by a computer (or a CPU or MPU) of the system or apparatus. In this case, the program codes read out from the storage medium implement the functions of the above embodiments, and the storage medium storing these program codes constitutes the invention. Furthermore, besides the functions of the above embodiments are implemented by executing the readout program codes by the computer, the present invention includes a case where an Operating System (OS) or the like running on the computer performs part or the whole of actual processing in accordance with designations by the program codes and thereby implements the functions of the above embodiments.

Furthermore, the present invention also includes a case where, after the program codes read out from the storage medium are written in a memory of a function extension board inserted into the computer or of a function extension unit connected to the computer, a CPU or the like of the function extension board or function extension unit performs part or the whole of actual processing in accordance with designations by the program codes and thereby implements the functions of the above embodiments.

The present invention can reduce the electric power consumed by an image processing apparatus.

Also, the preferred embodiments of the present invention can reduce the electric power consumed by an image processing apparatus without lowering the efficiency (e.g., the work efficiency) of image processing.

As many apparently widely different embodiments of the present invention can be made without departing from the spirit and scope thereof, it is to be understood that the invention is not limited to the specific embodiments thereof except as defined in the claims.

What is claimed is:

1. A processing apparatus comprising:
a power input unit adapted to connect a power supply;
a power circuit adapted to provide power to each part of the processing apparatus;
a switch adapted to connect or disconnect said power input unit and said power circuit, wherein the power is supplied to said power circuit from said power input unit through said switch; and
a connector adapted to receive an instruction given by another apparatus and to receive an electric power supplied from said another apparatus;
a power controller adapted to control said switch on the basis of the instruction given by said another apparatus via said connector, wherein said power controller is configured to operate by using the electric power supplied from said another apparatus via said connector.

2. The processing apparatus according to claim 1, further comprising:
a main controller adapted to give an instruction concerning control of said switch to said power controller,
wherein said power controller is configured to control said switch on the basis of the instruction given by said main controller.

3. The processing apparatus according to claim 1, further comprising:
a main controller adapted to give an instruction concerning control of said switch to said power controller,
wherein said power controller is configured to control said switch on the basis of the instruction given by said main controller and an instruction given by said another apparatus.

4. The processing apparatus according to claim 3, wherein said main controller is configured to operate by using the electric power supplied from said power circuit.

5. The processing apparatus according to claim 3, wherein said power controller is configured to control said switch to a connected state on the basis of the instruction given by said another apparatus, and is configured to control said switch to a disconnected state on the basis of the instruction given by said main controller and the instruction given by said another apparatus.

6. The processing apparatus according to claim 3, wherein said main controller is configured to determine, on the basis of information given by said another apparatus, whether said another apparatus is able to execute a predetermined operation, and gives an instruction concerning control of said switch to said power controller on the basis of the determination.

7. The processing apparatus according to claim 3, wherein when a state in which said another apparatus is unable to execute a predetermined operation continues for not less than a predetermined time, said main controller instructs said power controller to control said switch to the disconnected state.

8. The processing apparatus according to claim 1, further comprising:
a notifying unit adapted to notify said another apparatus of whether a predetermined operation is executable,
wherein said power controller is configured to control said switch on the basis of an instruction given by said another apparatus in response to the notification by said notifying unit.

9. The processing apparatus according to claim 8, wherein said power controller is configured to control said switch to the disconnected state on the basis of an instruction given by said another apparatus when a state in which a predetermined operation is unexecutable continues for not less than a predetermined time.

10. The processing apparatus according to claim 1, further comprising:
a sensor adapted to sense a specific state,
wherein said power controller is configured to control said switch on the basis of an output from said sensor.

11. The processing apparatus according to claim 10, further comprising:
an image reader adapted to read an image,
wherein said sensor is configured to sense an operation for starting image read, and said power controller is configured to control said switch to the connected state on the basis of the output from said sensor.

12. The processing apparatus according to claim 11, wherein said image reader includes one of a press plate and a document feeder, and said sensor is configured to sense opening/closure of one of said press plate and said document feeder.

13. The processing apparatus according to claim 11, wherein said image reader comprises an original platen, and said sensor is configured to sense that an original is placed on said original platen.

14. The processing apparatus according to claim 11, wherein said image reader comprises a document feeder, and said sensor is configured to sense that an original is placed on said document feeder.

15. The processing apparatus according to claim 10, wherein said sensor is configured to operate by using electric power supplied from said another apparatus.

16. The processing apparatus according to claim 1, wherein said power input unit is adapted to connect AC power supply, and said power circuit is adapted to convert AC voltage into DC voltage.

17. The processing apparatus according to claim 1, wherein said power circuit is adapted to provide power to an image reader adapted to read an image.

18. A processing apparatus having a function of connecting to a processing device, the processing device including:
a power input unit adapted to connect a power supply;

a power circuit adapted to provide power to each part of said processing device;

a switch adapted to connect or disconnect the power input unit and said power circuit,
wherein the power is supplied to said power circuit from power input unit through said switch; and a power controller adapted to control said switch, the processing apparatus comprising:

a connector adapted to give an instruction to said processing device and to supply electric power to said processing device;

a controller adapted to supply the electric power to said power controller of said processing device via said connector, and giving the instruction concerning control of said switch said power controller, wherein said power controller is configured to operate by using the electric power supplied from said controller via said connector.

19. The processing apparatus according to claim 18, wherein said controller is configured to determine on the basis of information given by the processing device, whether the processing device is able to execute a predetermined operation, and is configured to control the power controller on the basis of the determination.

20. The processing apparatus according to claim 19, wherein when a state in which the processing device is unable to execute a predetermined operation continues for not less than a predetermined time, said controller is configured to so control the power controller to set the switch to the disconnected state.

21. A processing system in which first and second processing apparatuses are connected, wherein said first processing apparatus comprises:

a power input unit adapted to connect a power supply;

a power circuit adapted to provide power to each part of the processing apparatus;

a switch adapted to connect or disconnect said power input unit and said power circuit,
wherein the power is supplied to said power circuit from said power input unit through said switch; and a first connector adapted to receive an instruction given by said second processing apparatus and to receive electric power supplied from said second processing apparatus;

a power controller which is configured to operate by using an electric power supplied from said second processing apparatus via said first connector, and is configured to control said switch on the basis of the instruction given by said second processing apparatus via said first connector, and said second processing apparatus comprises:

a second connector adapted to give an instruction to said first processing apparatus and to the supply electric power to said first processing apparatus, and a controller adapted to supply the electric power to said first processing apparatus via said second connector and give the instruction concerning control of said switch to said first processing apparatus via said second connector.

22. The processing system according to claim 21, wherein said first processing apparatus has a function of reading an image, and said second processing apparatus has a function of outputting an image provided by said first processing apparatus.

23. An image reading apparatus comprising:

a power input unit adapted to connect a power supply;

a power circuit adapted to provide power to each part of said image reading apparatus;

a switch adapted to connect or disconnect said power input unit and said power circuit, wherein the power is supplied to said power circuit from said power input unit through said switch;

a connector adapted to receive an instruction given by an image processing apparatus and to receive the electric power supplied from said image processing apparatus; and a power controller adapted to control said switch on the basis of the instruction given by said image processing apparatus via said connector, wherein said power controller is configured to operate by using the electric power supplied from said image processing apparatus via said connector.

24. The image reading apparatus according to claim 23, wherein said connector is adapted to connect to the image processing apparatus via a cable.

25. A processing apparatus comprising:

a power unit adapted to receive power supply and to provide power to each part of said processing apparatus;

a connector adapted to receive an instruction given by another apparatus and to receive an electric power supplied from said another apparatus; and a power controller adapted to activate said power unit on the basis of the instruction given by said another apparatus via said connector, wherein said power controller is configured to operate by using the electric power supplied from said another apparatus via said connector.

26. An image reading apparatus comprising:

a power unit adapted to receive power supply and to provide power to each part of said image reading apparatus;

a connector adapted to receive an instruction given by an image processing apparatus and to receive an electric power supplied from said image processing apparatus; and a power controller adapted to activate said power unit on the basis of the instruction given by said image processing apparatus via said connector, wherein said power controller is configured to operate by using the electric power supplied from said image processing apparatus via said connector.

* * * * *